July 13, 1937.  C. T. STEIN  2,087,206
TIMING DEVICE
Filed Oct. 9, 1936
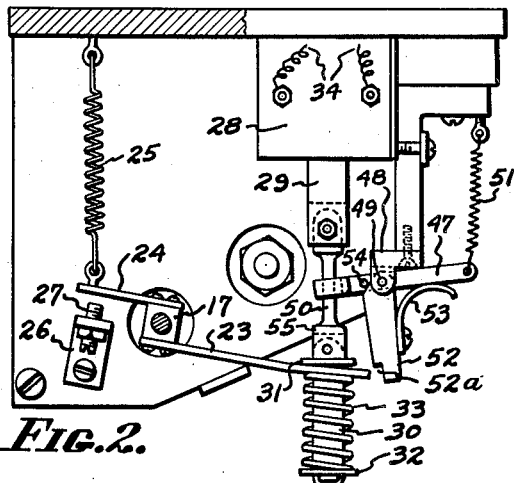
INVENTOR.
CHARLES THOMAS STEIN.
BY Allen & Allen
ATTORNEYS.

Patented July 13, 1937

2,087,206

UNITED STATES PATENT OFFICE 2,087,206

TIMING DEVICE

Charles Thomas Stein, Bellevue, Ky., assignor to The Wadsworth Watch Case Company, Dayton, Ky., a corporation of Kentucky Application October 9, 1936, Serial No. 104,912

16 Claims. (Cl. 200—91)

My invention relates to a timing device for electric welding machines and particularly to those types of welding machines where the welding operation is of extremely short duration. For example, in the manufacture of watch cases, certain lugs or ears must be welded to the main body of the casing. These parts are extremely small in mass and are of relatively high heat conductive qualities. For these reasons the duration of the welding current must be very short; it is so short that it is measured in cycles or even in fractions of cycles of alternating current rather than in seconds. For example, certain welds require a time of only one and one-half cycles of alternating current which represents an interval of time of 1/40 of a second; and periods of less than one cycle are sometimes used.

Various methods and apparatus have been proposed in the past for accomplishing the measurement of such short intervals of time, but for the most part, they have been impractical for the reason that they were extremely complicated and very expensive.

It is an object of my invention therefore, to provide a device which will measure extremely short intervals of time with extreme accuracy. It is also an object of my invention to provide a device, as above outlined, which will be very simple of construction and therefore relatively cheap to manufacture. Further objects of my invention include the provision of means for accurately predetermining the duration of the timing operation to any fraction of a cycle and to provide means whereby the circuit may be broken when the instantaneous value of current equals zero so as to prevent arcing.

These and other objects of my invention which will be pointed out hereinafter or which will appear to one skilled in the art upon reading these specifications, I accomplish by that construction and arrangement of parts of which I shall describe a preferred embodiment.

For a clearer understanding of the invention, reference is now made to the drawing which forms a part hereof and in which—

Figure 1 is a front elevation of a timing device in accordance with my invention.

Figure 2 is a horizontal cross sectional view taken along the line 2—2 of Fig. 1.

Figure 3 is a horizontal cross sectional view taken on the line 3—3 of Fig. 1.

Figure 4 shows an exemplary alternating current wave for the purpose of indicating at which point the circuit may be broken.

Briefly, in the practice of my invention, I provide a lead screw which is continuously rotated by a synchronous motor. Preferably, I rotate the lead screw at 3600 R. P. M. to the end that one revolution thereof will represent one cycle of alternating current. I arrange a follower in a position where it may engage the thread of the lead screw and I provide means for causing the engagement and for causing disengagement of the follower from the lead screw. These means are made adjustable so that any given time duration may be present. In connection with the follower I provide means for closing a circuit upon engagement thereof with the lead screw and for opening the circuit upon disengagement. I also provide means for preventing a repeat action.

Referring to Fig. 1, my timing device comprises a lead screw 10 which is mounted in a vertical position by means of the ball bearings 11 and 12 which are located in the brackets 13 and 14 of the main frame member 15. The lead screw is arranged to be driven at 3600 R. P. M. by a synchronous motor 16. Arranged in a vertical position adjacent the lead screw is a square rod 17 which is mounted between the pivot screws 18 and 19 so as to be capable of oscillatory motion. The member 17 carries a square collar 20 which is provided with a wing screw 21 so that its position vertically along the member 17 may be adjusted. Slidably mounted on the rod 17 is a sleeve 22, the lower position of which is limited by the aforementioned collar 20. The sleeve 22 carries the lead screw engaging means, the lead screw disengaging means and the circuit closing means as will be described hereinafter.

For the purpose of oscillating the rod 17 and for limiting the oscillation thereof, I have provided arms 23 and 24 which are screwed to the rod 17 near the top. A spring 25, fastened to the end of the arm 24 and to the main frame 15, urges the rod 17 in a clockwise direction. On the bracket 13, I have provided a small bracket 26 with an adjustable stop screw 27 for the purpose of limiting the counter clockwise oscillation of the rod 17.

Upon the bracket 13 I have mounted a solenoid indicated generally at 28 having a plunger 29. An extension 30 of the solenoid plunger 29 passes through an aperture in the arm 23 and is provided with flanges 31 and 32. Between the arm 23 and the flange 32 I have arranged a coil compression spring 33 for a purpose to be described hereinafter. The solenoid leads indicated generally at 34 are connected to a control button or the like, to initiate the welding operation at the will of the operator.

From the above description, it will be seen that when the operator closes the solenoid circuit through leads 34, the plunger 29 will be drawn inwardly and by means of the spring 33 and the arm 23, the rod 17 will be oscillated in a counter clockwise direction until the arm 24 abuts the stop screw 27.

Screwed to the sleeve 22 is an arm 35 which carries a follower element 36 which is held in position by means of a set screw 37 so that upon counter clockwise oscillation of the rod 17, the follower member 36 is adapted to enter the thread in the lead screw 10. It may be, of course, that at the instant that the follower member 36 attempts to enter a thread in the lead screw it may be opposite a raised portion but obviously it will be only an infinitesimal fraction of a second before the spring 33 will force it into the groove of the thread. As soon as the follower member 36 enters a thread of the lead screw 10, it will tend to travel upwardly causing the sleeve 22 to slide upwardly along the rod 17. Thus the entire assembly, including the sleeve 22, will ride upwardly until the follower 36 is disengaged from the thread of the lead screw, as will now be described.

Also mounted in a vertical position adjacent the rod 17 is a rod 38 which carries a conic cam member 39 which is held in any desired position by means of a set screw 40. The sleeve 22 has screwed to it an arm 41 carrying a small roller 42 so that when the follower 36 enters the thread in the lead screw 10, by virtue of counter clockwise oscillation of the rod 17, the roller 42 is brought into contact with the rod 38. As before described the assembly rides upwardly until the roller 42 meets the inclined surface of the conical cam member 39 and begins to ride up the inclined surface thereof. This oscillates the rod in a clockwise direction until the follower 36 is disengaged from the thread in the lead screw 10. When this occurs, of course, the entire assembly on the sleeve 22 drops downwardly along the rod 17 to its initial resting place which is determined by the position of the collar 20. It is not necessary that the roller 42 ride on the rod 38, so long as said roller is brought to such a position that the cam 39 will be effective to cause disengagement.

The welding contact is formed as follows:

I have provided a vertical rod 43 carrying a contact strip 44 and I have mounted by means of screws or the like, on the sleeve 22 a flexible contact arm 45 carrying a contact element 46 which is adapted to make contact with the member 44 and maintain contact therewith so long as the follower 36 is engaged in the thread on the lead screw. It will thus be seen that when the operator closes the solenoid circuit and thereby causes the rod 17 to oscillate in a counter clockwise direction so that the follower 36 enters the thread in the lead screw 10, the welding contact is established between the contact strip 44 and the contact element 46 and that this contact is maintained until the follower 36 is disengaged from the thread in the lead screw 10 by the action of the cam member 39 upon the roller 42. By a vertical adjustment of the cam member 39, a position may be determined where the break of contacts occurs in one of the points marked 0 (zero), in Fig. 4 whereby arcing will be eliminated. It will be clear that, if I provide a lead screw having a pitch of one-quarter inch and rotate the same at 3600 R. P. M., that each quarter inch movement of the sleeve member 22 and its associated elements will represent a time interval of one cycle.

As shown in Fig. 2, I have provided means for preventing a repeat action. If the operator holds the push button closed for a period longer than the complete welding operation, the solenoid 28 will immediately tend to cause a repetition of the welding operation. In order to prevent any such repetition, I have provided a forked arm 47 pivoted on the bracket 48 at 49. The forked portion of this arm is adapted to engage over the reduced portion 50 of the plunger extension. A spring 51 extending between the right-hand end of the arm 47 and the main frame tends to hold the arm 47 in the position shown in Fig. 2. Also pivoted at 49 is a notched arm 52 which is provided with a leaf spring 53 which bears against the right-hand end of the arm 47. The arm 47 is provided with a pin 54 which urges the notched arm 52 toward the right when the parts are in their normal position as shown in Fig. 2.

The operation of this device is as follows:

When the solenoid 28 is energized and the plunger 29 is drawn inwardly, the shoulder 55 of the plunger extension abuts the forked portion of the arm 47 and oscillates it in a clockwise direction. The right end portion of the arm 47 acting against the leaf spring 53, urges the notched arm 52 in a clockwise direction. By the time this action occurs, of course, the end of the arm 23 has passed the notch 52a. When the rod 17 is oscillated in a clockwise direction by the action of the cam 39, the arm 23 also moves in a clockwise direction until it passes the notch 52a. However, since the solenoid 28 is still energized, the tension in the spring 33 immediately tends to move the arm 23 again in a counterclockwise direction. However by virtue of the construction above described, the end of the arm 23 engages in the notch 52a so that a repeat operation is effectively prevented. As soon as the operator releases the push button the plunger 29 of the solenoid is released and the arm 23 then releases its pressure against the notch 52a and the spring 51 returns the arm 47 to the position shown. The arm 52 is returned to its position by the pin 54 on the arm 47.

The embodiment shown in the drawing is representative only of one embodiment of my invention and it will be clear that changes may be made without departing from the spirit of the invention. For example, the contact for the welding circuit might be established between the arm 24 and the stop screw 27 if desired. It is therefore to be understood that I do not intend to limit myself otherwise than as stated in the claims which follow.

Having now fully described my invention, what I claim as new and desire to secure by Letters Patent, is:—

1. An electric timing device comprising an element rotating at constant speed, an element adapted to be brought into engagement with said rotating element for linear movement, means for causing said engagement, means for causing disengagement of said elements after any predetermined length of linear movement, and means operative during engagement for completing an electric circuit.

2. An electric timing device comprising an element rotating at synchronous speed, an element adapted to be brought into engagement with said rotating element for linear movement, means for causing said engagement, means for causing disengagement of said elements after any predetermined length of linear movement, and means operative during said engagement for completing an electric circuit.

3. An electric timing device comprising a lead screw driven at synchronous speed, an element adapted to be brought into engagement with a thread of said lead screw for movement axially of said screw, means for causing said engagement, means for causing disengagement of said element and screw after any predetermined length of linear movement, and means operative during said engagement for completing an electric circuit.

4. An electric timing device comprising a lead screw driven at synchronous speed, an element adapted to be brought into engagement with a thread of said lead screw for movement axially of said screw, solenoid actuated means for causing said engagement at the will of the operator, means for causing disengagement of said element and screw after any predetermined length of linear movement, and means operative during said engagement for completing an electric circuit.

5. An electric timing device comprising a lead screw driven at synchronous speed, an element adapted to be brought into engagement with a thread of said lead screw for movement axially of said screw, solenoid actuated means for causing said engagement at the will of the operator, means for causing disengagement of said element and screw after any predetermined length of linear movement, means for preventing reengagement of said element and screw until said solenoid is deenergized for obviating repeat action, and means operative during said engagement for completing an electric circuit.

6. An electric timing device comprising a lead screw driven at synchronous speed, a member mounted for slidable movement parallel to the axis of said screw and for oscillatory movement in a plane perpendicular thereto, an element on said member adapted, upon oscillation of said member in one direction, to engage a thread of said screw for linear movement, a solenoid adapted to cause said oscillation of said member at the will of the operator, means for causing an oscillation of said member in the opposite direction for disengaging said element from said screw after a predetermined linear movement, means in connection with said solenoid for preventing further oscillation and reengagement of said element and screw until said solenoid is deenergized for obviating repeat action, and means operative during said engagement for completing an electric circuit.

7. An electric timing device comprising an element oscillable about an axis, means for transporting said element any predeterminable linear distance at constant speed when it is in one position of oscillation, means for closing an electric circuit during the time of said linear movement, means for oscillating said element to said position, and means for oscillating said element out of said position.

8. An electric timing device comprising an element rotating at constant speed, an element adapted to be brought into engagement with said rotating element for linear movement, means for causing said engagement, means for causing disengagement of said elements after a predetermined linear movement, and means operative during engagement for completing an electric circuit, said means for causing disengagement of said elements being adjustable to cause the break of said electric circuit to take place at a predetermined point in the cycle.

9. An electric timing device comprising an element rotating at constant speed, an element adapted to be brought into engagement with said rotating element for linear movement, means for causing said engagement, means for causing disengagement of said elements after any predetermined length of linear movement, and means operative during engagement for completing an electric circuit, the point at which said linear movement begins being adjustable to vary the length of time that said circuit is completed.

10. An electric timing device comprising an element rotating at constant speed, an element adapted to be brought into engagement with said rotating element for linear movement, means for causing said engagement, means for causing disengagement of said elements after any predetermined length of linear movement, and means operative during engagement for completing an electric circuit, the point at which said linear movement begins being adjustable to vary the length of time that said circuit is completed, said means for causing disengagement of said elements being adjustable to cause the break of said electric circuit to take place at a predetermined point in the cycle.

11. An electric timing device comprising a lead screw driven at synchronous speed, an element adapted to be brought into engagement with a thread of said lead screw for movement axially of said screw, means for causing said engagement, means for causing disengagement of said element and screw after any predetermined length of linear movement, and means operative during said engagement for completing an electric circuit, the point at which said axial movement begins being adjustable to vary the length of time that said circuit is completed, and said means for causing disengagement of said element and screw being adjustable to cause the break of said electric circuit to take place at a predetermined point in the cycle.

12. In an electric timing device having an element for causing linear movement and a second element adapted to engage said first element in response to the closing of an electric circuit to be moved thereby, and means for disengaging said elements at any predetermined point of travel, a device for preventing reengagement of said elements until said circuit is opened, regardless of the point of travel at which said disengagement takes place.

13. In an electric timing device having an element for causing linear movement and a second element adapted to engage said first element to be moved thereby and a lever for causing said engagement and a solenoid having a plunger for actuating said lever, and means for disengaging said elements at any predetermined point of travel; a device for preventing reengagement of said elements until said solenoid is deenergized, regardless of the point of travel at which said disengagement takes place, said device comprising a latch member having means for holding it in one position and means actuated upon energization of said solenoid for moving it to a second position, means for resiliently retaining said lever on the plunger of said solenoid, means for permitting operating movement of said plunger and lever before said latch is moved to its operative position, and means for moving said latch into operative position after said lever has passed said latch and for resiliently maintaining it in operative position during the time that said solenoid is energized, said latch preventing repeat motion of said lever, and said resilient construction permitting said plunger to remain in its inner position until said solenoid is deenergized.

14. An electric timing device comprising an element moving at constant speed, an element adapted to be brought into engagement with said moving element to be moved thereby, means for causing said engagement, means for causing disengagement of said elements after any predetermined length of movement, and means operative during engagement for completing an electric circuit.

15. An electric timing device comprising an element moving at synchronous speed, an element adapted to be brought into engagement with said moving element to be moved thereby, means for causing said engagement, means for causing disengagement of said elements after any predetermined length of movement, and means operative during said engagement for completing an electric circuit.

16. A device for causing the energization of an electric circuit with a predetermined number of cycles of pulsating current, which comprises motive means driven synchronously with said pulsations, controlling means moved thereby, and a circuit opening and closing means engageable with and movable by said controlling means, means for bringing said circuit opening and closing means into a position for actuation by said controlling means, means for determining the time of engagement of said circuit opening and closing means therewith with reference to said cycles, and disengagement means for said circuit opening and closing means for determining the time of disengagement thereof with reference to said cycles.

CHARLES THOMAS STEIN.